April 16, 1963 C. W. PILCH 3,085,552
STOCK FEEDING DEVICE
Filed Feb. 27, 1961 2 Sheets-Sheet 2
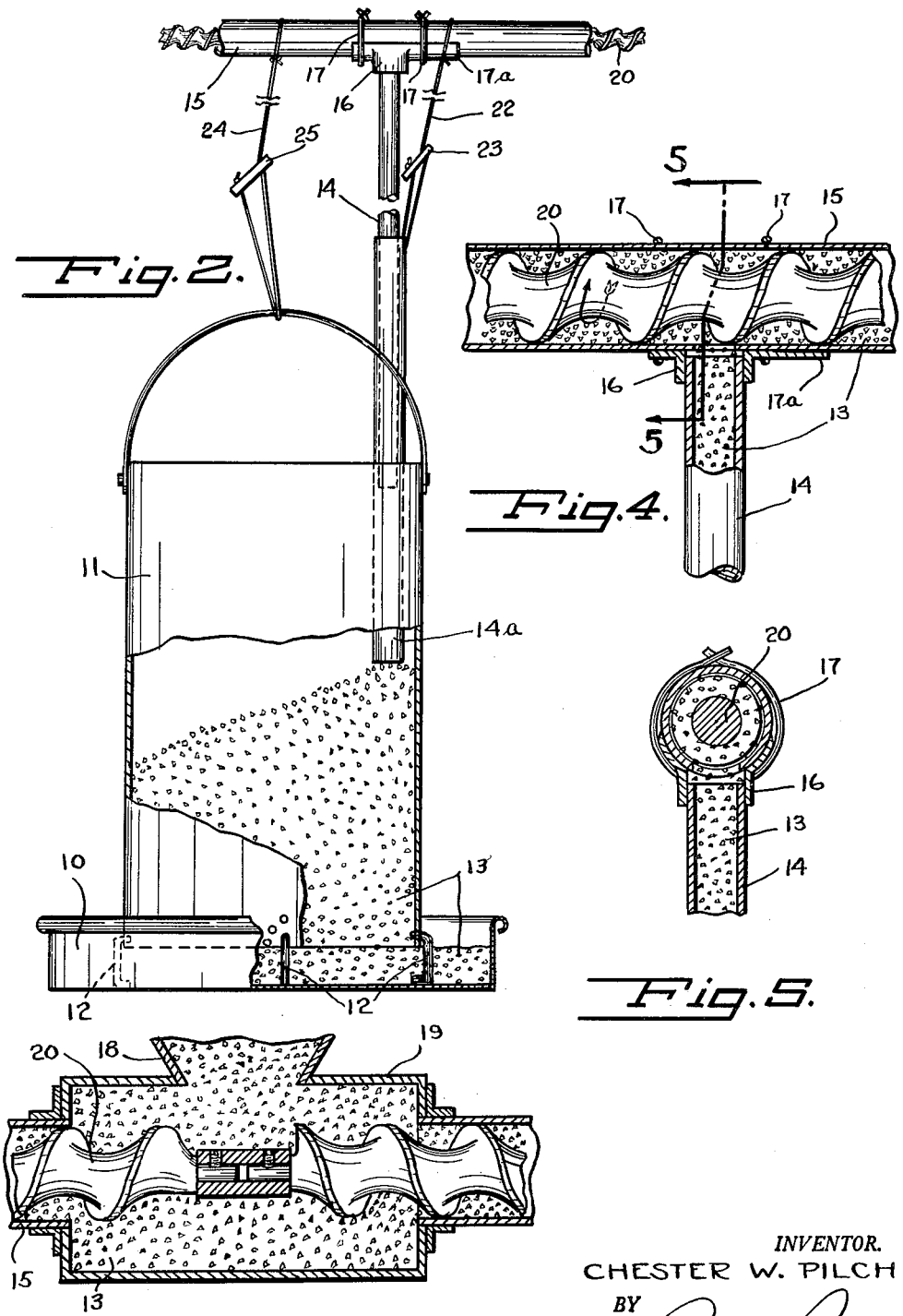
INVENTOR.
CHESTER W. PILCH
BY
Raymond A. Paquin
ATTORNEY.

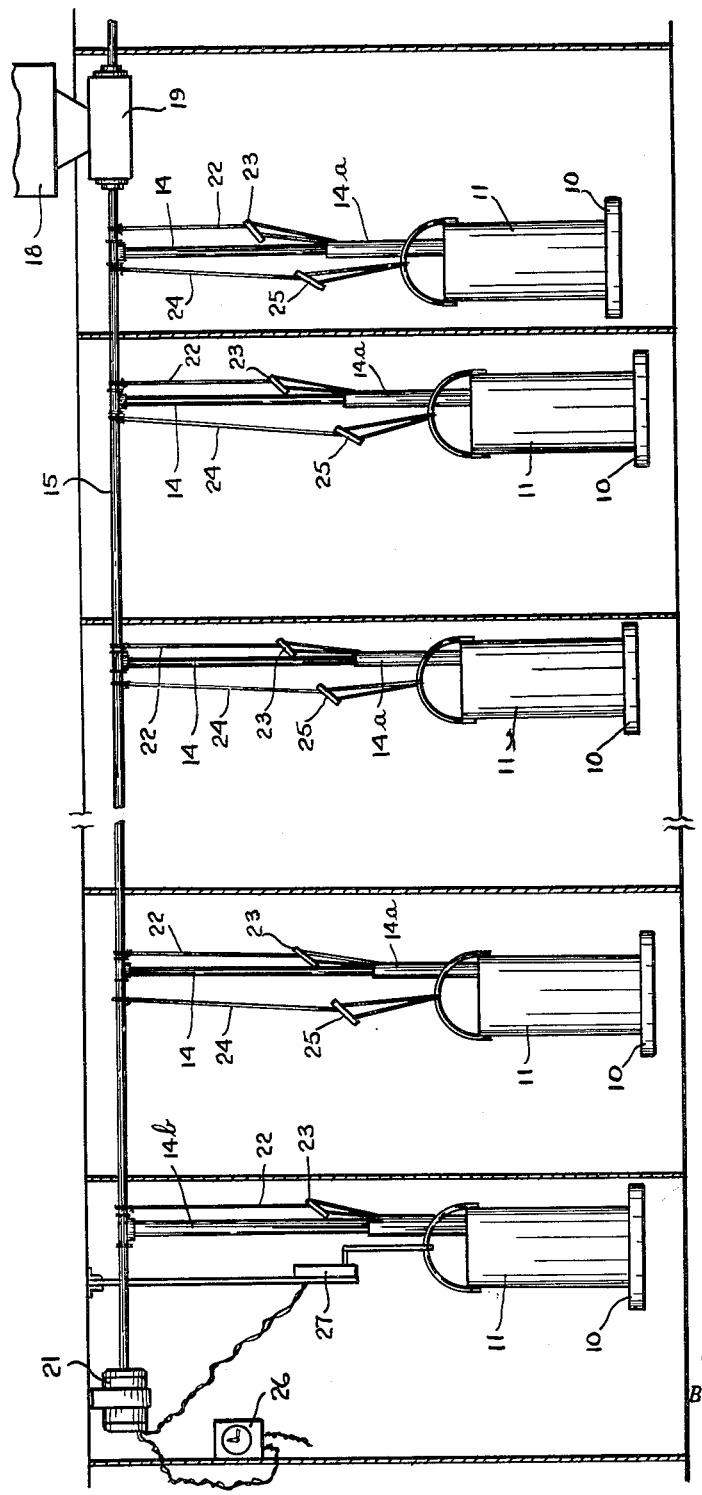

United States Patent Office 3,085,552
Patented Apr. 16, 1963

3,085,552
STOCK FEEDING DEVICE
Chester W. Pilch, Moody Road, Hazardville, Conn.
Filed Feb. 27, 1961, Ser. No. 91,744
9 Claims. (Cl. 119—57)

This invention relates to new and improved stock feeding apparatus.

An object of this invention is to provide a means of supplying food, particularly dry mash or the like, to stock with a minimum amount of manual labor.

Another object is to provide food in measured quantities within close limits.

Another object is to provide a device of the type set forth which is relatively simple and economical in construction, yet efficient in operation.

Another object is to provide a device of the type set forth which can be easily and quickly assembled on the job without welding or threading and which can be easily and quickly rearranged.

Other objects and advantages of the invention will be apparent from the following description taken in connection with the accompanying drawings.

Referring to the drawings:

FIG. 1 is a front view of a stock feeder embodying the invention;

FIG. 2 is a fragmentary view, on an enlarged scale and partially in section, of the apparatus of FIG. 1;

FIG. 3 is a sectional view drawn to an enlarged scale through the pickup box showing the feed screw;

FIG. 4 is a sectional view drawn to an enlarged scale of the joint between the feed pipe and the telescoping down drops; and FIG. 5 is a sectional view taken on line 5—5 of FIG. 4, looking in the direction of the arrows.

Referring more particularly to the drawings wherein similar reference characters designate corresponding parts throughout, the apparatus shown embodying the invention consists of a series of pens each supplied with a tray 10 and a hopper 11 adjustable in the tray by links 12, these links being used to change the level of the feed 13 in the trays 10. The feed is supplied to the hoppers 11 by telescoping non-metallic downdrops 14 and 14a supplied in turn from a feed pipe 15 and connected to the feed pipe 15 by a flange 16 which is clamped to the pipe 15 by spring clips 17 or tape or other suitable detachable means.

The use of the non-metallic downdrops allows the use of relatively small diameter pipes or tubes without danger of bridging by the feed in the pipes. If too large a diameter pipe is employed the amount of feed passing therethrough can be too great for desired feeding. Preferably the flange 16 is formed integral with pipe 14 for simplification and economy. Also, flange 16 can be provided with extension 17a whereby any unused openings in pipe 15 can be closed off by covering such opening with extension 17a.

The feed is supplied from a supply hopper 18 to a pickup box 19. An auger or feed screw 20 or other suitable means in pipe 15 is rotated by motor 21 and moves the feed 13 along the pipe 15 past the upper ends of the telescoping pipes 14. The feed fills the pipe 14 nearest the pickup box 19 first and in turn fills the remaining pipes 14, etc. until the last pipe 14b is filled. This last pipe is preferably of larger diameter than the pipes 14, also the opening for pipe 14b in pipe 15 is larger than the opening for the other pipes.

The level of the feed in hopper 11 is regulated by the positioning of the lower section 14a of telescoping pipe 14, adjusted by cord 22 and block 23 or other suitable means. The height of the trays are regulated by cords 24 and block 25 or other suitable means.

It will be seen that the telescoping tubes are not necessary in the last downdrop because the weight switch controls the amount of feed contained by the last tray.

If desired, automatically opening and closing covers could be provided for the trays which close when the timing means is on and open when the switch goes off, thereby preventing eating while the feeding is going on and provides more accurate control.

In use, the height of trays 10 are set depending on the size of the stock being fed. The height of the telescoping pipe 14a is then adjusted as the amount of feed in the hopper 11 will depend on the positioning of the bottom end of pipe 14a. This process of adjustment is performed in each of the pens in turn.

The feeding apparatus is preferably operated during the night by a time clock 26, when the lights are out or the stock is asleep in order to obtain more accurate control, and in turn, each tray and hopper is filled with its predetermined amount of feed. When the last tray 10 and hopper 11 has its supply of feed a weight switch 27, controlled by this hopper, is tripped, thus shutting off motor 21.

From the foregoing, it will be seen that I have provided means for obtaining all of the objects and advantages of the invention.

I claim:

1. In a device of the character described, a supply hopper adapted to receive feed, a pickup box communicating with said supply hopper, a feed pipe communicating with said pickup box, a feed screw for advancing feed in said feed pipe, motor means for actuating said feed screw, a plurality of spaced hoppers and trays adapted to receive feed from said feed pipe, means for supporting each of said spaced trays in adjusted position, and vertical pipes connecting said feed pipe and said hoppers and trays, said vertical pipes comprising upper and lower sections in telescoping relation and means for supporting said lower section in adjusted position relative to its respective hopper to control the level of feed in said hopper.

2. A device of the character described, a supply hopper, a pickup box positioned beneath said hopper and communicating therewith, a substantially horizontal pipe line communicating with said pickup box, feed advancing means in said horizontal pipe line and motor means for actuating said feed advancing means, a series of vertical feed pipes each connected to said horizontal pipe and in spaced relation with each other and a feed tray communicating with each of said vertical pipes, said vertical pipes being detachably connected to said horizontal pipes and comprising upper and lower relatively adjustable sections and means for retaining said lower section in adjusted position relative to its hopper to control the level of feed in said hopper, each of said feed trays being adjustable separately to its respective feed pipe.

3. In a device of the character described, a supply hopper adapted to receive feed, a pickup box communicating with said hopper, a feed pipe communicating with said pickup box, a feed screw for advancing feed in said feed pipe, motor means for actuating said feed screw, a plurality of spaced hoppers and trays adapted to receive feed from said feed pipe, means for supporting each of said spaced trays in adjusted position and vertical pipes connecting said feed pipe and said hoppers and trays, said vertical pipes comprising upper and lower sections in telescoping relation and means for supporting said lower section in adjusted relation to control the level of feed in said hopper, said vertical pipes being non-metallic.

4. A device of the character described, a supply hopper, a pickup box positioned beneath said supply hopper and communicating therewith, a substantially horizontal pipe line communicating with said pickup box, feed advancing means in said horizontal pipe line and motor means for actuating said feed advancing means, a series of vertical pipes each connected to said horizontal pipe and in spaced relation with each other and a hopper and feed tray communicating with each of said vertical pipes, said vertical pipes being detachably connected to said horizontal pipes and a feed tray communicating with each of said vertical pipes, said vertical pipes being non-metallic.

5. In a device of the character described, a supply hopper adapted to receive feed, a pickup box communicating with said supply hopper, a feed pipe communicating with said pickup box, feed advancing means in said feed pipe, motor means for actuating said feed advancing means, a plurality of spaced hoppers and trays adapted to receive feed from said feed pipe and a vertical pipe connecting said feed pipe and each of said hoppers and trays, the last of said vertical pipes being larger than the others thereof.

6. In a device of the character described, a supply hopper adapted to receive feed, a pickup box communicating with said supply hopper, a feed pipe communicating with said pickup box, feed advancing means in said feed pipe, motor means for actuating said feed advancing means, a plurality of spaced hoppers and trays adapted to receive feed from said feed pipe and a vertical pipe connecting said feed pipe and said hoppers and trays, said vertical pipes comprising telescoping sections adapted to be relatively adjusted and means for supporting said sections in adjusted relation, said vertical pipes being non-metallic, the last of said vertical pipes being larger than the others thereof.

7. In a device of the character described, a supply hopper adapted to receive feed, a pickup box communicating with said supply hopper, a feed pipe communicating with said pickup box, feed advancing means in said feed pipe, motor means for actuating said feed advancing means, a plurality of spaced hoppers and trays adapted to receive feed from said feed pipe and a vertical pipe connecting said feed pipe and said trays, said vertical pipes each having telescoping sections adapted to be adjusted relative to its hopper and tray to control the quantity of feed supplied thereto and means for supporting said sections in said adjusted relation, and timing means for effecting automatic operation of said motor.

8. In a device of the character described, a supply hopper adapted to receive feed, a pickup box communicating with said supply hopper, a feed pipe communicating with said pickup box, feed advaning means in said feed pipe, motor means for actuating said feed advancing means, a plurality of spaced hoppers and trays adapted to receive feed from said feed pipe and a vertical pipe connecting said feed pipe and each of said trays, the last of said vertical pipes being larger than the others thereof, and timing means for effecting automatic operation of said motor.

9. A device of the character described, a supply hopper, a pickup box positioned beneath said supply hopper and communicating therewith, a substantially horizontal pipe line communicating with said pickup box, feed advancing means in said horizontal pipe line and motor means for actuating said feed advancing means, a series of vertical pipes each connected to said horizontal pipe and in spaced relation with each other and a hopper and tray communicating with each of said vertical pipes, said vertical pipes being detachably connected to said horizontal pipes, said vertical pipes being non-metallic, the last of said vertical pipes being larger than the others thereof, and timing means for effecting automatic operation of said motor, the last of said hoppers and trays having weight switch means for discontinuing the operation of said motor.

References Cited in the file of this patent
UNITED STATES PATENTS

| | | |
|---|---|---|
| 811,038 | Croshier | Jan. 30, 1906 |
| 1,392,311 | Egeland | Oct. 4, 1921 |
| 2,681,639 | Littlefield | June 22, 1954 |
| 2,782,760 | Wolfe | Feb. 26, 1957 |
| 2,942,574 | Golay | June 28, 1960 |